United States Patent [19]
Fulghum

[11] 3,800,612
[45] Apr. 2, 1974

[54] BELT DRIVE APPARATUS
[75] Inventor: David A. Fulghum, La Grange, Ill.
[73] Assignee: International Harvester Company, Chicago, Ill.
[22] Filed: Oct. 10, 1972
[21] Appl. No.: 296,463

[52] U.S. Cl. ................................ 74/242.15 R
[51] Int. Cl. ............................... F16h 7/10
[58] Field of Search .................... 74/242.15 R

[56] References Cited
UNITED STATES PATENTS
3,311,186   3/1967   Kamlukin ............... 74/242.15 R X
3,001,599   9/1961   Fryar ..................... 74/242.15 R X Primary Examiner—Leonard H. Gerin
Attorney, Agent, or Firm—Dennis K. Sullivan; Floyd B. Harman

[57] ABSTRACT

A belt drive apparatus having a clutching pulley assembly held in the engaged position by a spring wherein a second spring opposes the first spring during engagement to allow smooth engagement of the belt.

11 Claims, 6 Drawing Figures

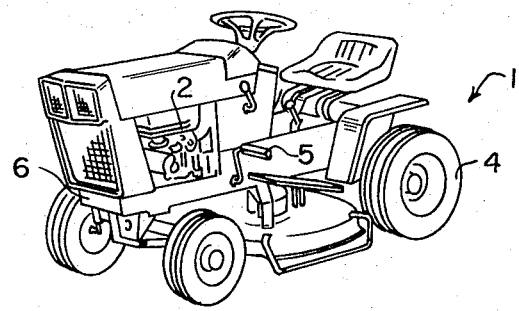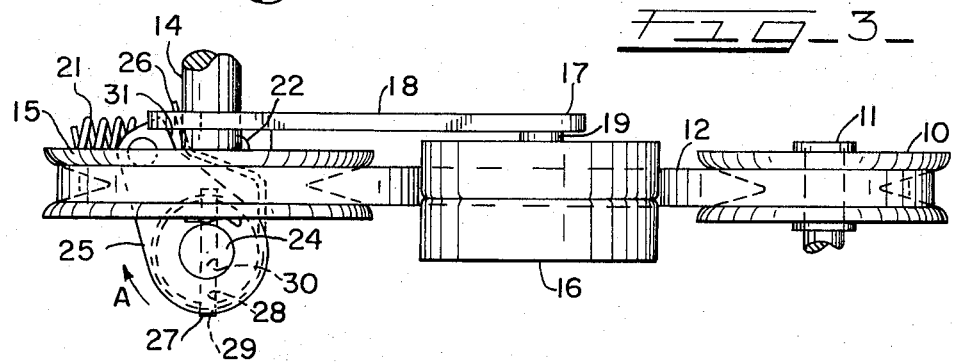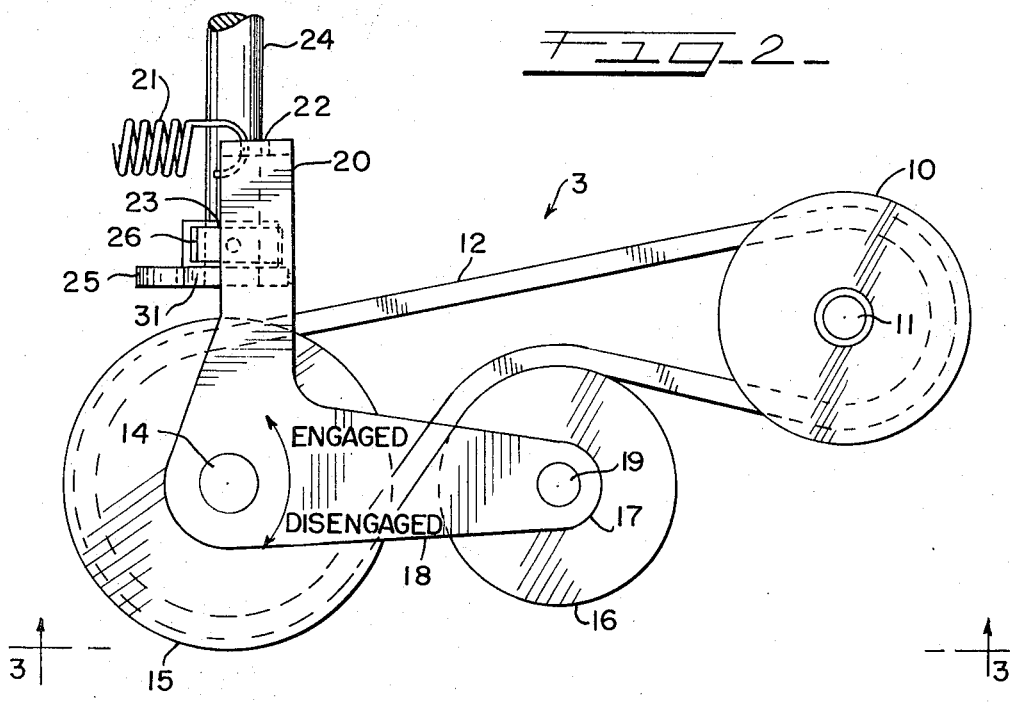

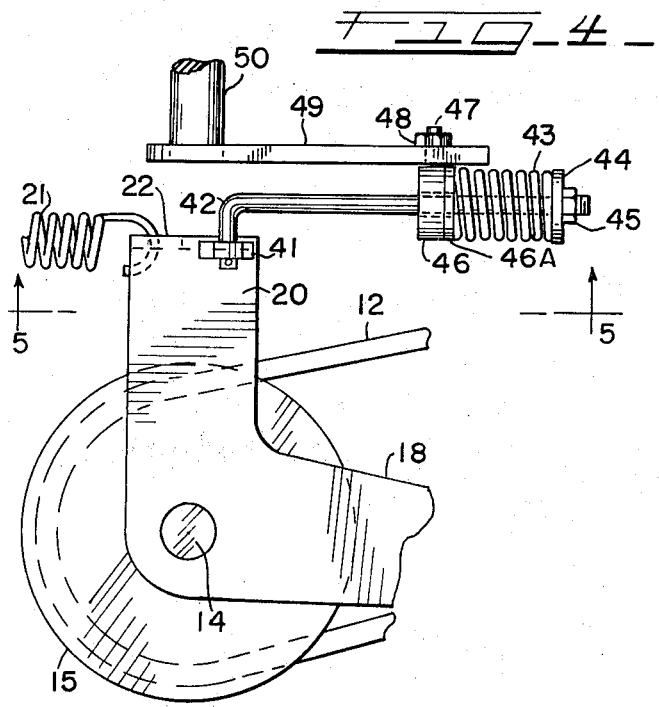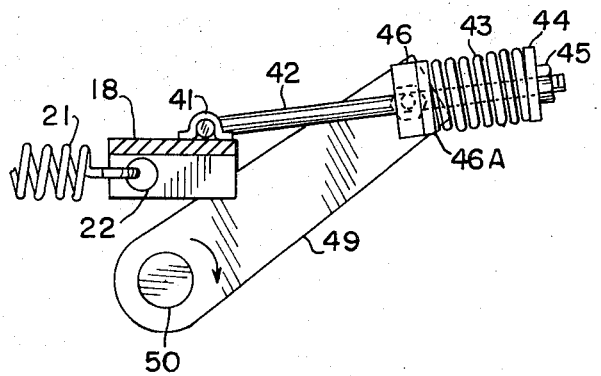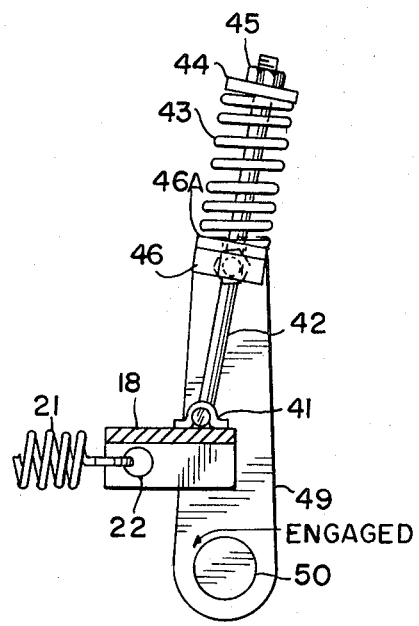

BELT DRIVE APPARATUS

BACKGROUND OF THE INVENTION

A particular problem area in the engagement and disengagement of belt drive apparatus, such as those used in the traction drive of riding-type garden tractors, is providing for slow and uniform engagement of the traction drive thereby giving a smooth start especially when the machine is being operated by an inexperienced person. Many belt type clutches used in riding type lawn mowers tend to be very aggressive and erratic and tend to grab or jerk when engaged. When incorporated in a traction drive, this will result in fast jerky starts which may present a very serious safety problem.

In accordance with the present invention, a feathering spring is incorporated in the belt clutching system which biases against the force tending to engage the belt thus permitting a uniform application of tension to the belt and therefore smooth engagement.

BRIEF DESCRIPTION OF THE DRAWINGS

FIG. 1 is a pictorial view of a riding-type garden tractor which may incorporate the novel belt drive apparatus disclosed herein;

FIG. 2 is a top plan view illustrating a belt drive apparatus, shown in the engaged position, incorporating the inventive concepts disclosed herein;

FIG. 3 is a side elevational view of the belt drive apparatus shown in FIG. 2;

FIG. 4 is a fragmentary view of a belt drive apparatus showing a second embodiment of the spring arrangement shown in FIG. 2 and shown in a disengaged position;

FIG. 5 is a sectional view of FIG. 4 taken substantially along the line 5—5; and FIG. 6 is a sectional view of FIG. 4 taken substantially along the line 5—5 but showing the apparatus in an engaged position.

DESCRIPTION OF THE PREFERRED EMBODIMENTS

Attention is first directed toward FIG. 1 showing a riding-type lawn or garden tractor of the type which would typically incorporate the instant invention, although it will be understood that the instant invention can be applied to any type of belt drive assembly incorporating a clutch idler pulley. The tractor 1 comprises a frame 6 having an engine 2 mounted thereon having an output shaft 11 (FIG. 2) which transmits power through a belt drive assembly generally designated 3 to rear wheels 4 when the belt drive assembly 3 is clutchingly engaged by the release of clutch pedal 5.

The belt drive apparatus 3 comprises a drive pulley 10 fixedly mounted to drive shaft 11, as by being bolted thereto, which is drivingly engaged with the output shaft of engine 2. Belt 12 frictionally and drivingly connects drive pulley 10 with driven pulley 15 when the belt 12 is placed under tension and transmits power from drive pulley 10 to driven pulley 15. The driven pulley 15 is fixedly mounted on shaft 14 which is rotatably mounted to the frame 6 and operably connected in driving relationship with the wheels 4. The belt 12 is of sufficient length that it will be in the untensioned state when it is wrapped around pulleys 10 and 15 and not contacted by the clutching idler pulley 16.

The clutching idler pulley 16 is rotatably mounted on clutching arm 18, pivotally mounted on shaft 14, at a distal end 17 thereof by means of pin 19. At the end 20 of the clutching arm 18 opposite the end 17, the clutching arm 18 is connected to tension spring 21 which may be hooked through a hole 22 in clutching arm 18. The tension spring 21 is connected at its other end to the frame 6 of the tractor 1 and biases the clutching idler pulley 16 to a first or engaging position with the belt 12 thereby placing the belt 12 under tension, causing power to be transmitted from the pulley 10 to the pulley 15. The clutching idler pulley 16 is caused to be moved from a first engaging position with the belt 12 to a second position disengaged from said belt when sufficient force is applied on the surface 23 to overcome the engaging force generated by the tension spring 21.

The clutch shaft 24 is rotatably mounted to the frame 6 and operably connected with clutch pedal 5 such that depression of the clutch pedal 5 will cause the clutch shaft 24 to rotate in the direction shown in FIG. 1 as "A". The arm 25 and the feathering spring 26 wrapped about a portion thereof are mounted on the end of the shaft 24 by the pin 27 extending through the holes 28, 29 and 30 extending through the arm, spring, and shaft respectively, thus fixing their relative angular relationship. The angular relationship between the arm 25 and the spring 26 to the clutching arm 18 must be such that the rotation of the shaft 24 will cause the spring 26 to contact surface 23 of the clutching arm 18 first and that further rotation of the shaft 24 will cause the surface 31 of the arm 25 to also contact surface 23. It will be understood that the travel of the pedal 5 should cause sufficient rotation in shaft 24 to allow the arm 25 and spring 26 to rotate from a position disengaged with clutching arm 18 to a position sufficient to cause the clutch idler pulley 16 to disengage the belt.

The feathering spring 26 is preferably made of spring steel and has a spring constant sufficient to provide a force fully offsetting that of the tension spring 21 when the surface 31 of arm 25 just contacts the surface 23 of the clutching arm 20, although it will be understood that the feathering spring 26 might offset only a portion of the force caused by tension spring 21 without departing from the true scope of the invention. It is further apparent that the arm 25 could be eliminated entirely although this is not desirable since the feathering spring could be permanently damaged by excessive rotation of the shaft 24.

In the operation of the invention, when the pedal 5 is depressed, the clutch shaft 24, clutch arm 25 and feathering spring 26 rotate in a direction "A" toward the clutching arm 18 causing the feathering spring 26 to contact surface 23. As the clutch shaft 24 and arm 25 continue to rotate, the feathering spring 26 deflects until surface 31 contacts surface 23. At this point the force from the feathering spring 26 offsets the force from the extension spring 21 thereby allowing the clutching arm 18 and the clutch idler pulley 16 to rotate about shaft 14 to the disengaged or second position thereby releasing the tension on the belt 12 and allowing it to disengage.

During the engagement process as the clutch pedal 5 is released, the clutch shaft 24 and clutch arm 25 rotate in a direction opposite direction "A" shown in FIG. 3. As the feathering spring 26 returns to its undeflected position, the engaging force from the extension spring 21 is slowly applied to the belt 12 through the clutching arm 18 and clutch idler pulley 16 until the feathering spring 26 becomes disengaged from the surface 23 of the clutching arm 18 at which point the belt is fully engaged.

Thus the invention herein described allows for a broader range of travel of the clutch shaft and arm during engagement and a uniform application of the engaging force which results in a smoother engagement of the belt 12 with the drive pulley 10 and the driven pulley 15.

THE EMBODIMENTS OF FIGS. 4-6

In the embodiment of FIGS. 4-6 an alternative design of the clutch shaft arm 25 and feathering spring 26 of the previous embodiment is shown. In this embodiment the clutching arm 18 is provided at its end 20 with the mounting member 41 disposed thereon, as by welding, receiving L-shaped shaft 42 rotatable therein. At its distal end the L-shaped shaft 43 passes axially through compression spring 43 and retainer washer 44. Nut 45 is disposed on L-shaped shaft 42 to retain the retaining washer 44. At the opposite end of spring 43, spring retainer 46 and retaining washer 46a are slidably mounted on shaft 42. Shaft 47 extending radially from retainer 46 passes through the arm 49 and is retained by nut 48 thus permitting retainer 46 to pivot with respect to the arm 49. The arm 49 is fixedly connected to the clutch shaft 50 which is operatively connected to clutch pedal 5. The compression spring 43 preferably will be sufficiently strong to overcome the force of tension spring 21 before the spring 43 becomes solid.

In operation when the clutch shaft 50 and arm 49 are rotated toward a disengaged position (shown in FIG. 5), as by the depression of clutch pedal 5, the retainer 46 will move toward the end of shaft 42 and cause the spring 43 to be compressed gradually thereby gradually increasing the force acting on the L-shaped rod 42 to overcome the tension spring 21. When the force on tension spring 21 is overcome, either by the spring force from spring 43 or by the force directly transmitted through arm 49 should the spring 43 become solid, the clutching arm 18 and the clutch idler pulley 16 will rotate to the disengaged position thereby releasing the tension of the belt 12.

Conversely when the clutch shaft 50 is rotated to the engaged position, the engaging force of the tension spring 21 will be gradually applied as the compression spring 43 relaxes. When the compression spring 43 reaches a relaxed or free state, the clutching arm 18 and clutch idler pulley 16 will then be in the first or engaged position and the belt 12 will be fully tensioned and transmitting power from the drive pulley 10 to the driven pulley 15.

It will be appreciated that the embodiments of the invention chosen for the purposes of illustration and description herein are preferred based upon requirements for achieving the objects of the invention and developing the utility thereof in the most desirable manner, due regard being had to existing factors of economy, simplicity of design, and construction and production methods and the methods are to be effected. It will be understood that the particular structures and functional aspects emphasized herein are not intended to exclude but rather to suggest such other modifications and adaptations as fall within the spirit and scope of the invention.

What is claimed is:

1. A belt drive apparatus comprising:

a drive pulley adaptable to be driven by a source of power;

a driven pulley;

a belt adaptable to frictionally engage said drive pulley and said driven pulley and transmit power therebetween upon said belt being subjected to tension;

an idler pulley shiftable from a first position tensioning said belt to a second position wherein said belt is in a relatively untensioned state preventing the transmission of power between said drive pulley and said driven pulley;

positioning means rotatably connected to said idler pulley for shifting said idler pulley between said first position and said second position;

shifting means actuating said positioning means to shift said idler pulley from said first position to said second position;

first spring means operatively connected to said positioning means and normally biasing said positioning means to said first position; and second spring means opposing said first spring means while said idler pulley is being shifted from said second position to said first position.

2. The invention according to claim 1 wherein said second spring means is connected to said shifting means and is adaptable to bias against said positioning means.

3. The invention according to claim 2 wherein said second spring means comprises a leaf spring.

4. The invention according to claim 3 wherein said shifting means comprises a clutch shaft having an arm thereon adaptable to prevent excessive deflection of said leaf spring.

5. In a traction vehicle having a frame, a power source and traction means mounted on said frame, a belt drive apparatus operatively connecting said power source and said traction means and interruptably transmitting power therebetween comprising:

a drive pulley drivingly engaged to said power source, a driven pulley drivingly engaged with said traction means, a belt adaptable to frictionally engage said drive pulley and said driven pulley to transmit power therebetween upon said belt being subjected to tension, an idler pulley shiftable from a first position tensioning said belt to a second position wherein said belt is relatively untensioned thereby interrupting the transmission of power between said drive pulley and said driven pulley, positioning means movably connected to said frame and rotatably connected to said idler pulley for shifting said idler pulley between said first position and said second position, shifting means operatively mounted to said frame and actuating said positioning means to shift said idler pulley from said first position to said second position, first spring means operatively connected to said positioning means and normally biasing said positioning means to said first position, and second spring means connected to said shifting means and adaptable to bias against said positioning means and oppose said first spring means while said idler pulley is being shifted from second position to said first position.

6. The invention according to claim 5 wherein said second spring means comprises a leaf spring.

7. The invention according to claim 6 wherein said shifting means comprises a clutch shaft rotatably mounted to said frame and having an arm thereon adaptable to prevent excessive deflection to said leaf spring.

8. In a belt drive apparatus for a garden tractor, said belt drive apparatus including a drive pulley, a driven pulley, an endless belt, a clutch idler pulley having a position engaging said belt and a position disengaged from said belt, first spring means associated with said clutch idler pulley to bias said pulley to said engaged position, an operator actuable clutching linkage adapted to shift said idler pulley between said engaged and disengaged positions, the improvement comprising second spring means operatively associated with said clutching means, to oppose said first spring means during the shifting of said clutch idler pulley to the engaged position.

9. The invention in accordance with claim 8 wherein said clutching linkage comprises a rotatable clutching arm, said clutch idler pulley being rotatably mounted on said arm, and an operator controlled clutch shaft adapted to contact and rotate said clutching arm to move said clutch idler pulley to the disengaged position, said second spring means being disposed between said clutch shaft and said clutching arm to provide a resilient connection therebetween during the engagement of said clutch idler pulley with said belt.

10. The invention in accordance with claim 9 and said second spring means being inoperative when said clutch idler pulley is in the engaged position.

11. The invention in accordance with claim 10 and said second spring means comprising a leaf spring mounted on said clutch shaft and having an end adapted to contact said clutching arm upon rotation of said clutch shaft.

* * * * *